United States Patent Office 2,901,315
Patented Aug. 25, 1959

2,901,315

PROCESS OF OXIDIZING PLUTONIUM

Charles D. Coryell, Oak Ridge, Tenn., assignor to the United States of America as represented by the United States Atomic Energy Commission No Drawing. Application July 31, 1944
Serial No. 547,509

1 Claim. (Cl. 23—14.5)

The present invention relates to the oxidation of the element having an atomic number of 94, known as plutonium (symbol Pu), and a method of carrying out this oxidation.

An object of the invention is to provide a new method for oxidizing plutonium in a rapid and efficient manner.

Another object of the invention is to provide an oxidizing agent having unusually good oxidizing properties for plutonium.

Other objects and advantages of this invention will be apparent from the following description.

Plutonium is produced by neutron bombardment of uranium followed by aging the neutron-bombarded product. In the bombardment of uranium ($U^{238}$) with neutrons the uranium ($92^{238}$) is converted to a different uranium isotope, $92^{239}$, which has a mass of 239 and an atomic number of 92. This isotope has a half-life of 23 minutes and converts by beta decay to element $93^{239}$ which has a mass of 239 and an atomic number of 93. Element 93 has a half life of 2.3 days and decays in turn by beta decay to an isotope of element 94 having a mass of 239 and an atomic number of 94. This element 94 is known as plutonium. It is produced in small quantities, associated with large quantities of uranium and other elements, such as highly radioactive nuclear fission products that make the mass extremely difficult to handle without danger to personnel.

As a result of all these conditions, the recovery in reasonably concentrated form of plutonium from a neutron-bombarded uranium mass is a difficult process.

One way of recovering plutonium is by taking advantage of the difference in properties between plutonium in its lower oxidation states with valences of three ($Pu^{+3}$) and four ($Pu^{+4}$) and in its higher oxidation state with a valence of six, $PuO_2^{++}$. Thus, in its lower oxidation states plutonium forms insoluble compounds such as insoluble plutonous fluoride and this plutonium may be precipitated from solution by hydrogen fluoride or soluble fluorides such as potassium fluoride and sodium fluoride, in acid solution. Plutonium in its lower oxidation states also forms insoluble iodates, being precipitated by potassium iodate, $KIO_3$, in acid solution. On the other hand, many corresponding compounds of plutonium in its higher oxidation state such as plutonyl fluoride, plutonyl iodate, plutonyl phosphate, etc. are relatively soluble in all these reagents, i.e., the higher oxidation state of plutonium forms soluble fluorides and soluble iodates. Similarly plutonium may be precipitated in its oxidized state, for example, as a complex acetate such as sodium plutonyl acetate or sodium magnesium plutonyl acetate, whereas plutonium in its reduced or lower valence state will not precipitate to any substantial degree as the corresponding plutonous compounds.

Accordingly in order to take advantage of these properties of plutonium, it is desirable to provide a method for rapid and efficient oxidation of plutonium from its lower ($Pu^{+4}$) and/or ($Pu^{+3}$) to its higher oxidation state. (The oxidation of $Pu^{+3}$ to $Pu^{+4}$ takes place readily in the absence of reducing agents and in the presence of oxygen similar to the conversion of ferrous to ferric iron.)

In accordance with the present invention it has been found that plutonium may be oxidized from a lower valence to its highest oxidation state rapidly and substantially completely by reaction of the plutonium with an argentic compound. Preferably the process is conducted by reacting plutonium in an aqueous solution with a water-soluble argentic compound. For example, a solution of argentic nitrate stabilized with nitric acid and argentous nitrate is a powerful and rapid oxidant for plutonium and may be prepared in relatively stable form. These compounds are found to be especially effective since the compounds act as their own indicators of completeness of reaction. The addition of a slight excess of reagent causes production of a characteristic brown color in an otherwise relatively colorless solution. The active agent of the argentic oxidizing solution of the present invention is the argentic ion ($Ag^{++}$). The nitric acid and the argentous ion ($Ag^+$) are present as stabilizing agents for the argentic ion.

This process has been found to be superior in many respects to other oxidation processes. For example oxidizing agents such as chlorine ($Cl_2$), dichromate ($Cr_2O_7^=$), and potassium persulfate ($K_2S_2O_8$) with argentous ion catalyst can be used for oxidizing plutonium. However, most of these agents do not have the rapid action at room temperature or the self-indicating features of the argentic oxidizing agent of the present invention.

When $K_2S_2O_8$ with a silver catalyst is used to oxidize plutonium it has been found that the reaction is excessively sensitive, i.e., if too much heat is applied there is a failure to obtain oxidation of plutonium either because of oxidation of water by the oxidizing agent or oxidation by oxidized plutonium; if too little heat is applied the reaction is too slow to be practical.

Dichromate, usually in the form of potassium dichromate, can be used as an oxidizing agent for plutonium and under certain conditions is very satisfactory. However, it does not have the rapid action at room temperature and the self-indicating features of the argentic oxidizing agent of the present invention. Furthermore, in the presence of hydrogen fluoride and steel, dichromate does not hold the plutonium completely in its higher oxidation state.

In the preparation of an argentic oxidizing solution to be used in the present invention, argentic oxide (AgO) or argentic peroxynitrate may be dissolved in a cold solution approximately 9 normal in nitric acid and 0.4 normal in silver nitrate.

Another method of preparing the oxidizing agent of the present invention is by the anodic oxidation of silver nitrate in nitric acid.

Argentic oxide used in this invention may be prepared from silver nitrate in solution by first forming argentic peroxynitrate, and transforming this to argentic oxide. Such a process may be conducted in the following manner:

A water solution is prepared by dissolving 3.8 grams of pure silver nitrate in 10 milliliters of water. To this are added 2.8 grams of pure potassium persulfate $$(K_2S_2O_8)$$

using four 10 milliliter portions of water to effect the transfer and heating the last portion to insure complete solution of the potassium salt. This treatment results in the rapid formation of the black emery-like silver peroxy compound accompanied by very little gas evolution. After about 20 to 30 minutes the solution is centrifuged and there is obtained a dull black precipitate and a light brown acid solution. Both the precipitate and the solution exhibit some bubbles resulting from the slow evolution of oxygen.

To this light brown acid solution, 20 milliliters of saturated sodium acid carbonate solution is added in order to reduce the loss of argentic silver ions which would otherwise escape in the solution. On standing, additional peroxy compound is precipitated in amount equal to about one-third of that obtained by centrifugation.

The total peroxy precipitate is washed twice with distilled water in the centrifuge cups. It is then transferred to a beaker and extracted in situ with boiling water for about 30 minutes. The extraction is accompanied by the free evolution of oxygen while the peroxynitrate is being changed over to argentic oxide. Frequently some rather large (0.6 millimeter) white crystals, probably argentic sulfate ($Ag_2SO_4$), are seen floating on the surface. These are decanted off, the argentic oxide precipitate is washed, and then it is dried in a centrifuge tube. A yield of about 1.1 grams is obtained.

Nitric acid solution of approximately 16 normal is prepared by flushing out the $NO_2$ gas present by means of compressed air. A silver nitrate solution is prepared by dissolving 34 grams in 50 milliliters of water. To 120 milliliters of the 16 normal nitric acid solution, 20 milliliters of distilled water and 20 milliliters of the silver nitrate solution are then added. The mixture is cooled in an ice bath and about 70 milliliters of clear solution are decanted off from the silver nitrate which has crystallized out in moderate amounts. To the 70 milliliters of solution are then added, with their stirring, about 1.1 grams of powdered argentic oxide prepared as described above. With the addition of the first particles there is an instantaneous formation of argentic ions in the solution (in which there is present no appreciable quantity of $NO_2$). Evolution of gas occurs where the powder contacts the solution, but none appears after stirring. An odor of ozone ($O_3$) is noticed. The intense brown-black solution is about 0.1 normal in argentic ions ($Ag^{++}$), about 9 normal in nitric acid, and about 0.4 normal in argentous ions ($Ag^+$). In order to test the stability of the stabilized argentic oxidizing agent as prepared above, a portion of it is allowed to stand at room temperature and another portion is allowed to stand in ice. Neither portion should show evidence of gas evolution or weakening of the solution after one week.

As an example of the use of the stabilized argentic oxidizing agent of the present invention, the following experiment was carried out:

*Example I*

Argentic solution was prepared by dissolving AgO in 11 M $HNO_3$, the AgO and $HNO_3$ both having been prepared substantially as described above. The solution being oxidized was a nitrate solution of radioactive 94 containing enough plutonium to give about 400 counts on a Geiger-Müller counter per minute per milliliter of solution. The oxidizing solution was slowly added to the plutonium solution at room temperature and addition continued until the solution became brown in color. During the addition the solution was vigorously stirred. The solution was allowed to stand for a measured period of time and plutonium in its reduced state removed by adding 0.1 milligram of $La^{+3}$ per 0.1 milliliter of solution to act as a carrier and the solution made 0.6 N in HF. Since this precipitates all plutonium in the lower valence states ($Pu^{+3}$ and $Pu^{+4}$), the percentage remaining in the filtrate as measured by the counts on a Geiger-Müller counter after the precipitate is filtered off is taken as the percentage oxidized. The following table summarizes the results of several tests performed in this manner.

| Oxidizing Solution | Time of standing after addition of oxidizing agent, minutes | Percent Plutonium oxidized | Comment |
|---|---|---|---|
| (a) 0.1 M $Ag^{++}$, 11 M $HNO_3$, about 0.2 M $Ag^+$. | 1 | 98 | |
| (b) 0.01 M $Ag^{++}$, 1.1 M $HNO_3$, about 0.02 M $Ag^+$. | 1 | 97 | definite brown color in solution. |
| (c) 0.01 M $Ag^{++}$, 1.1 M $HNO_3$, about 0.02 M $Ag^+$. | 20 | 97.5 | brown color practically gone. |
| (d) 0.01 M $Ag^{++}$, 1.1 M $HNO_3$. | 13 | 98 | brown color disappeared in 3 min. |

Examination of the results of the above experiments shows that the use of (a) 0.1 M $Ag^{++}$, 11 M $HNO_3$, and about 0.2 M $Ag^+$ and (b) 0.01 M $Ag^{++}$, 1.1 M $HNO_3$, and about 0.02 M $Ag^+$ both give practically complete oxidation in 1 minute. Experiment (c) was carried out repeating experiment (b) but using a longer period of time. Experiment (c) shows that the reaction does not go appreciably further if a longer time is used.

Experiment (d) used the same reagent as experiments (b) and (c) except that no $Ag^+$ ion was present. This experiment shows that the reagent works nearly as well but a little slower without $Ag^+$ ion.

As shown in the above example, argentic ion solution of the present invention offers a rapid and efficient method of oxidizing plutonium from its lower to its higher state of oxidation. This property can be readily made use of in separating plutonium from uranium and other substances by precipitation in its fluoride-insoluble lower oxidation state, filtering to remove insoluble impurities, and then oxidizing with stabilized argentic ion oxidizing agent to convert the plutonum to its soluble higher oxidation state.

Although the present invention has been described with respect to the specific details of certain embodiments thereof, it is not intended that such details shall be regarded as limitations upon the scope of the invention except insofar as included in the accompanying claim.

I claim:

A process of oxidizing plutonium in combined soluble form from a valence state selected from the group consisting of +3 and +4 to a +6 valence state which comprises treating the plutonium in combined soluble form and in a valence state selected from the group consisting of +3 and +4 with a solution above 0.01 molar in argentic ion, above 1.1 molar in nitric acid and above 0.02 molar in argentous ion.

References Cited in the file of this patent

UNITED STATES PATENTS 2,785,951    Thompson et al. _____ Mar. 19, 1957

OTHER REFERENCES

Mellor: "Inorganic and Theoretical Chemistry," vol. 3, page 385, Longmans, London (1923).

AEC Document CC–199, July 25, 1942, pages 2, 3.

Seaborg et al.: "Journal of the American Chemical Society," vol. 70, pages 1128–1134 (1948).